United States Patent [19]

Meek et al.

[11] Patent Number: 4,923,017

[45] Date of Patent: May 8, 1990

[54] HINGE FOR VERTICALLY FOLDING WING SECTION OF AGRICULTURAL IMPLEMENT

[75] Inventors: Roger L. Meek, Williamsburg; Alan F. Barry, Fairfax, both of Iowa

[73] Assignee: Kinze Manufacturing, Inc., Williamsburg, Iowa

[21] Appl. No.: 403,663

[22] Filed: Sep. 6, 1989

[51] Int. Cl.⁵ .............................................. A01B 73/04
[52] U.S. Cl. .................................... 172/776; 172/456; 172/466
[58] Field of Search ............... 172/311, 452, 456, 457, 172/459, 446, 414, 466, 481, 494, 640, 776; 111/52

[56] References Cited

U.S. PATENT DOCUMENTS

| | | | |
|---|---|---|---|
| 3,692,121 | 9/1972 | Kenney | 172/456 |
| 3,774,693 | 11/1973 | Orthman | 172/311 |
| 3,941,194 | 3/1976 | Orthman | 172/311 |
| 4,030,551 | 6/1977 | Boetto et al. | 172/456 X |
| 4,046,203 | 9/1977 | Ward | 172/456 |
| 4,074,766 | 2/1978 | Orthman | 172/311 |
| 4,117,893 | 10/1978 | Kinzenbaw | 172/311 |
| 4,328,869 | 5/1982 | Perelli | 172/311 |
| 4,400,994 | 8/1983 | Skjaeveland | 172/776 X |
| 4,512,416 | 4/1985 | Smith | 172/466 X |
| 4,526,235 | 7/1985 | Kinzenbaw | 172/126 |
| 4,660,654 | 4/1987 | Wiebe et al. | 172/456 X |

*Primary Examiner*—Randolph A. Reese
*Assistant Examiner*—Jeffrey L. Thompson
*Attorney, Agent, or Firm*—Emrich & Dithmar

[57] ABSTRACT

A folding mechanism for the wing section of an agricultural implement frame includes a main hinge interconnecting the wing section to the center section for pivotal motion about a horizontal axis. A hydraulic cylinder is pivotally connected at the butt end to the center frame section and at the rod end to a pivot juncture between a locator link and a push link. When the hydraulic cylinder is extended, the push link forces the wing section to rotate to the folded position; and the locator link guides the movement of the pivot juncture into an over-center, locked position so that the wing section will remain in the transport position even if hydraulic pressure is lost.

7 Claims, 3 Drawing Sheets

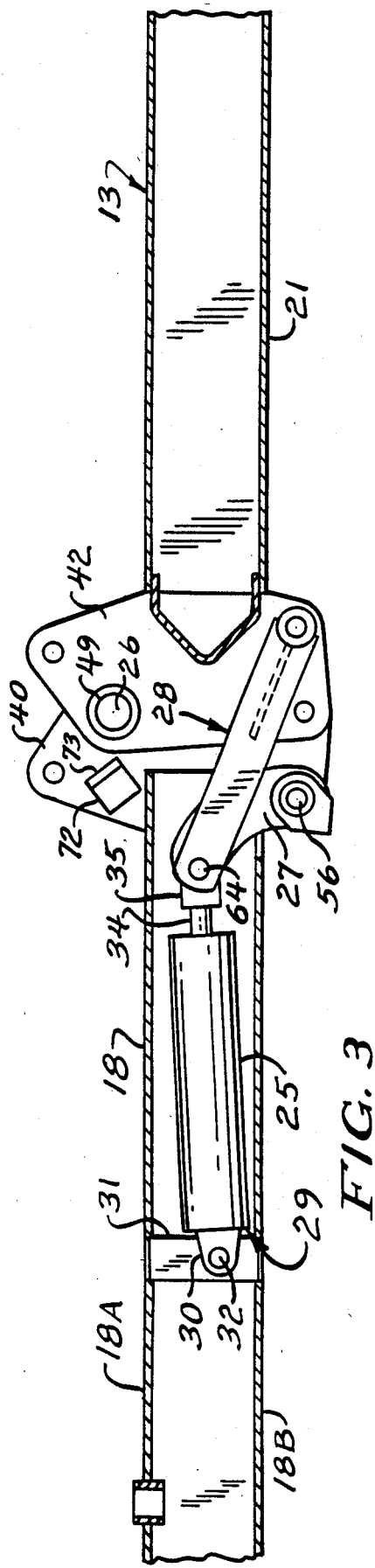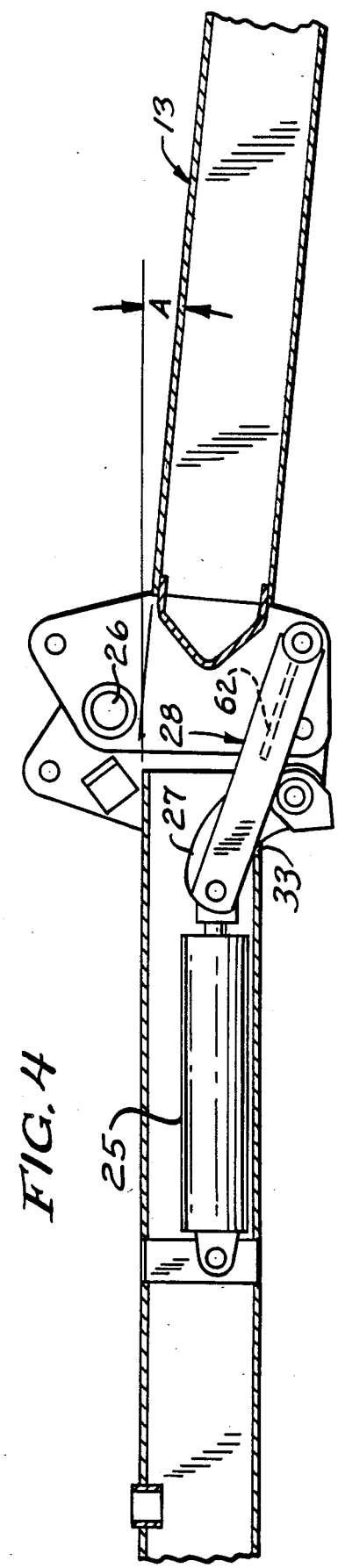

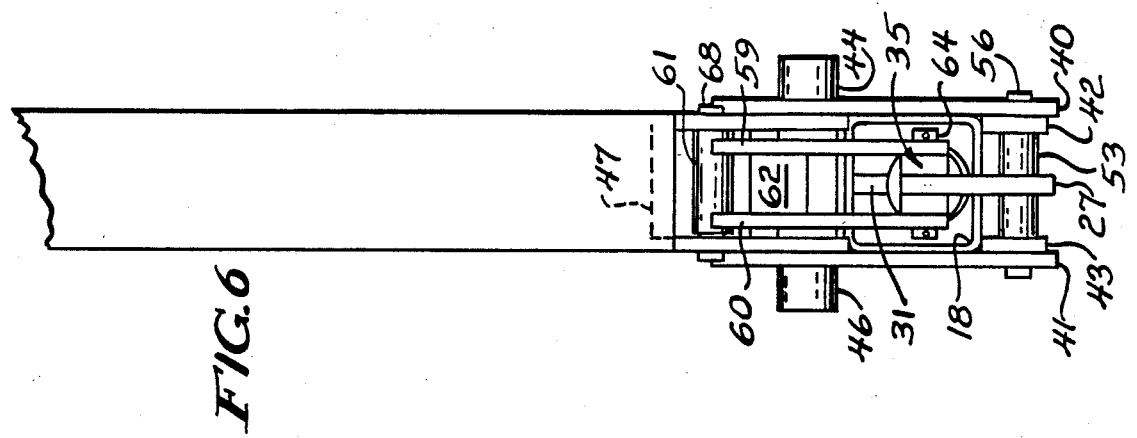
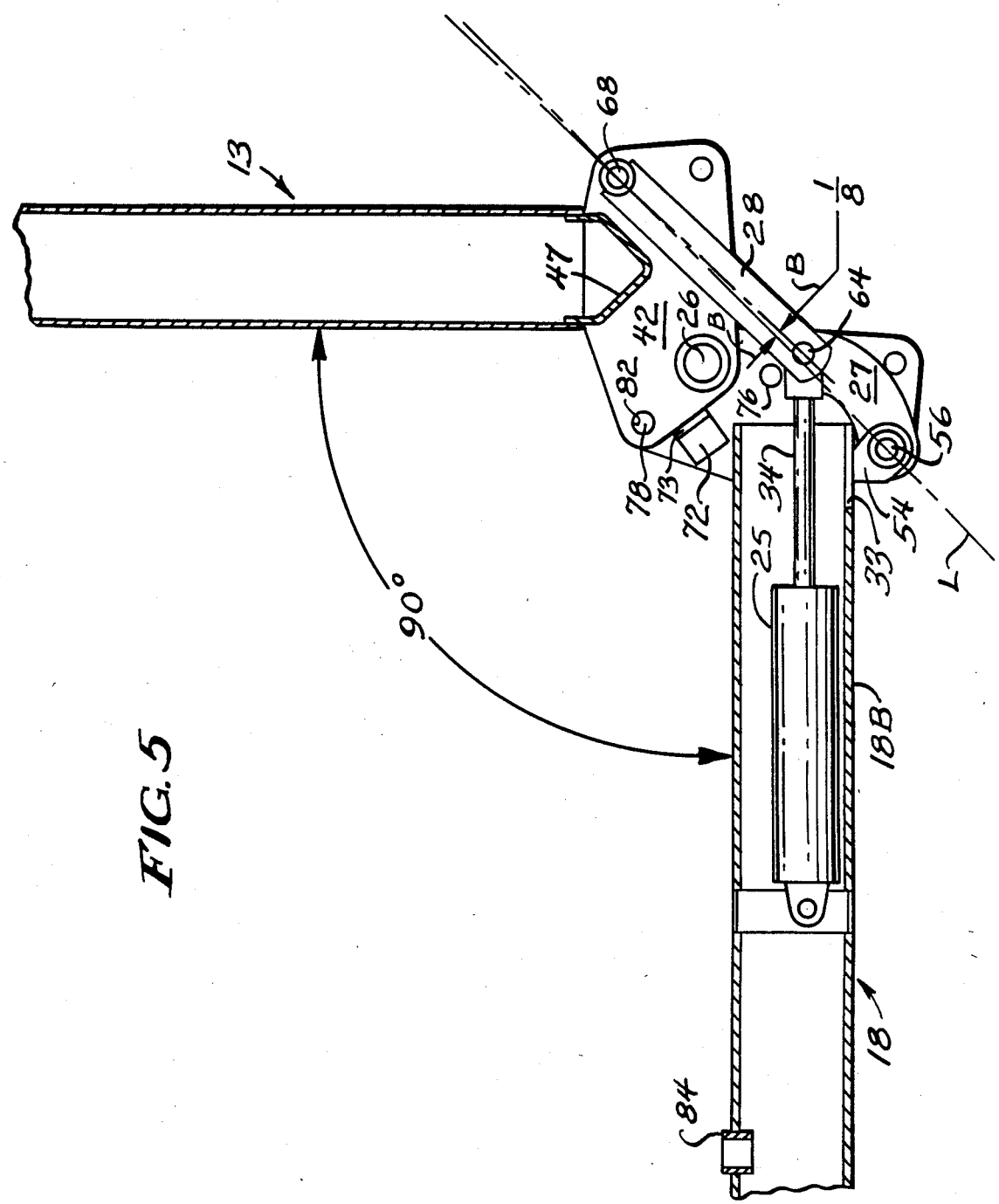

HINGE FOR VERTICALLY FOLDING WING SECTION OF AGRICULTURAL IMPLEMENT

FIELD OF THE INVENTION

The present invention relates to agricultural implements of the type drawn behind tractors and having a main or center frame section and outboard wing sections which fold vertically for transport. In particular, the present invention is directed to an improved hinge assembly for interconnecting a vertically folding wing section to a center frame section of an agricultural implement frame or toolbar.

BACKGROUND AND SUMMARY OF THE INVENTION

Modern agricultural implements, such as chisel plows, disc cultivators or planters have become larger with the increasing horsepower in tractors so that in a single pass, a much wider swath of soil is worked or planted. The increasing width of agricultural implements has made it difficult to transport the implements through field gates or over the road from field to field. Provisions have been made to permit the implements to fold for transport.

One common folding configuration provides for a center frame section which is mounted to the tractor and first and second outboard frame sections or "wings".

The center frame section and the outer frame sections each include an elongated mounting bar (sometimes referred to as a "toolbar") on which the working tools or, in the case of a planter, the row units are mounted.

When the implement is in the field or use position, the wings are lowered so that the wing mounting bars are generally horizontal and aligned with the mounting bar of the center frame section. A hinge mechanism interconnects each wing mounting bar with the associated outboard end of the mounting bar of the center frame section. In the use position, the hinge sections must permit the wing sections to move up and down or "flex" to conform to variations in ground contour during use.

When it is desired to transport the implement, the wing sections are folded to vertical positions by the hinge assemblies, which include hydraulic cylinders providing the power necessary to raise the wing sections to the folded position.

In the transport position, the mounting bars are normally in generally vertical positions, at least for the kind of implement of the type with which the present invention is concerned, although other configurations are known.

In a vertically folding implement frame of this type, when the wing mounting bars are in the folded, vertical position, the tools or planter row units remain mounted to the wing sections and extend outwardly of their associated mounting bars. Thus, the weight of the tools or row units normally has a tendency to force the wing sections back to the horizontal position. In some prior art hinge assemblies for vertically folding implement frames, it is possible that if hydraulic pressure is lost in one or both of the hydraulic cylinders holding the wing sections in their transport position, the weight of the tools or row units would cause the wing section to drop.

It is obviously undesirable to permit a wing section to fall because of the potential damage to the tools on the wing, and also because the farmer may be transporting the implement through a narrow passage or gate or into a barn or storage shed, and further damage could be caused. Thus, implements of this type normally have mechanical locks for locking the wings in the vertical position so there is no possibility of having the wing section fall when it is mechanically locked in the raised position. Mechanical locks are used for road transport, but it is inconvenient and time-consuming to lock the wings in the raised position every time the wing sections are folded. Locking is not always necessary for safety reasons, particularly when the farmer may be planting end rows or transporting his planter from one section of a field to another section of the same field and it is not necessary to travel over a road.

The present invention provides an improved hinge assembly for interconnecting the wing section of a vertically folding agricultural implement frame with the center section of the implement frame. The hinge assembly includes a hydraulic cylinder pivotally connected at the butt end to the center frame section and at its rod end to a pivot juncture between a locator or idler link and a push link. The other end of the push link is pivotally connected to the wing frame, and the other end of the locator link is pivotally connected to the center frame section.

When the hydraulic cylinder is extended, the push link forces the wing section to rotate in a vertical motion about a horizontal axis parallel to the direction of travel through an arc of approximately 90° until the mounting bar of the wing is in a generally vertical position. The locator link guides the movement of the pivot juncture (and thus, the movement of the rod end of the cylinder as well as of the inboard end of the push link). The hinge assembly is designed such that when the hydraulic cylinder is in a fully-extended position, the pivot juncture passes to an over-center position—that is, the pivot juncture passes through a line extending between the axis of the pivot connection of the push link and the wing frame and the pivot axis of the idler link and the center frame. A stop is provided so that the movement of the pivot juncture is limited to prevent further motion of the pivot juncture beyond the desired over-center position. In this manner, the force of the wing section is transmitted through the push link to the locator link and the locator link acts as a crank-stop. The weight of the wing section acts to lock the hinge assembly in the raised position, and it is necessary to retract the hydraulic cylinder before the wing section can be lowered again.

Thus, when the wing section is raised to the folded position, the hinge assembly locks the wing section, and the wing section cannot be lowered even if hydraulic pressure to the cylinder is lost.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIGS. 3 and 4 are vertical cross-sectional views of the hinge assembly of FIG. 2 taken in vertical planes along the axes of the mounting bars and with the hinge assembly in the lowered or use position and illustrating the flexing ability of the wing section;

FIG. 5 is a view similar to FIG. 3 with the wing section folded to the vertical position; and FIG. 6 is a vertical elevational end view of the hinge assembly as seen from the right in FIG. 5.

DETAILED DESCRIPTION OF THE PREFERRED EMBODIMENT

Figures 1, 2:
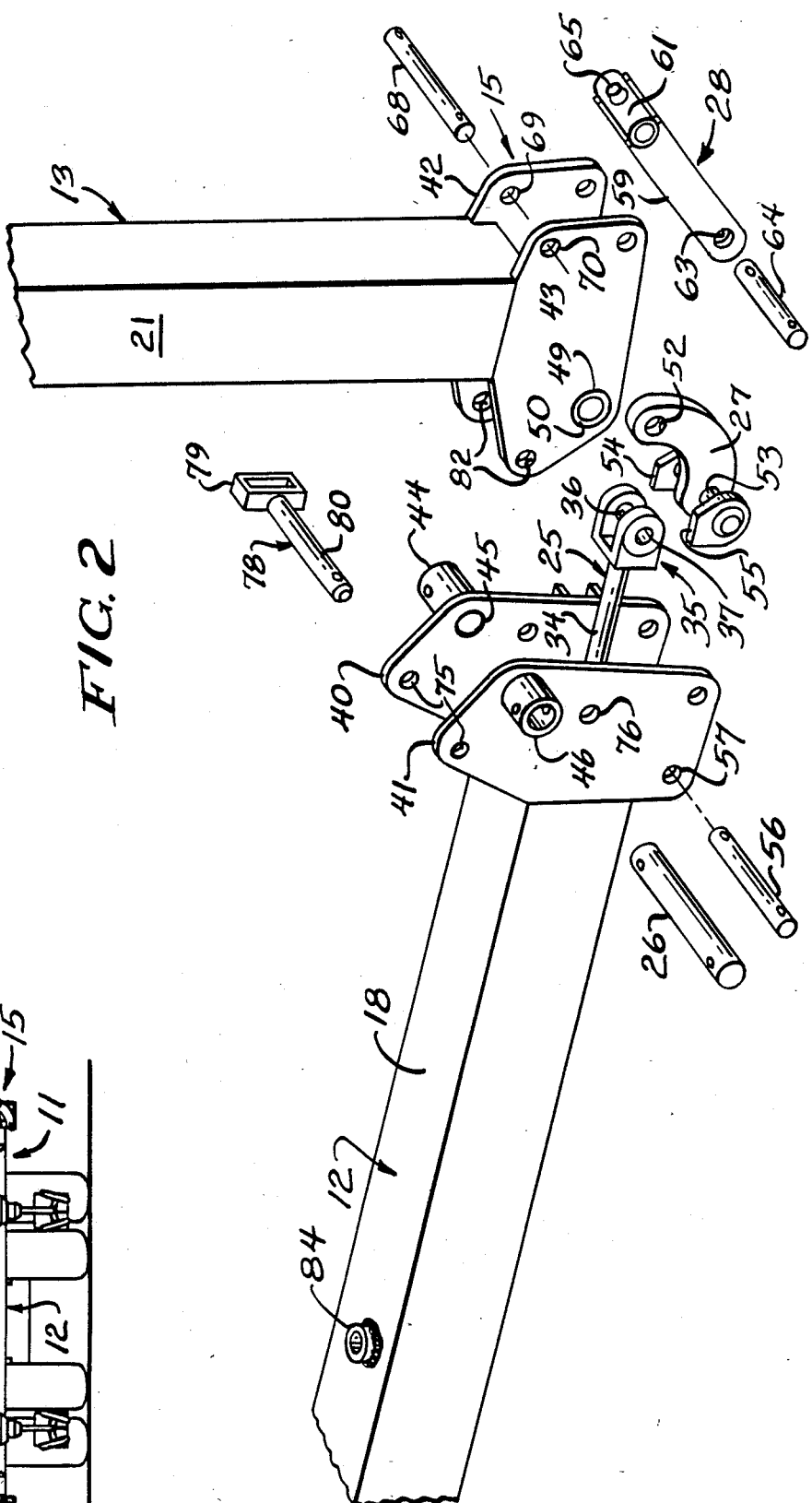
FIG. 1 is a rear view of a winged implement incorporating the present invention with the wing sections in the folded or vertical position.
FIG. 2 is a perspective, close-up view, taken from the rear, of a hinge assembly for the winged implement of FIG. 1 with the various components shown in exploded relation and with portions of the mounting bars in fragmentary form.

The present invention is illustrated in the form of an agricultural row crop planter mounted to a tractor by means of a conventional three-point hitch. Persons skilled in the art will readily appreciate that implements of a different type, such as a chisel plow or a cultivator, as well as implement frames mounted by different means to the tractor may equally well incorporate the hinge assembly of the present invention.

Turning first to FIG. 1, reference numeral 10 generally designates an agricultural tractor; and reference numeral 11 generally designates an implement frame mounted behind the tractor 10 and adapted to be pulled by the tractor. In the case of mounting the implement frame to the tractor by means of a three-point hitch, the implement frame 11 may be raised above the ground by the three-point hitch, as is well-known in the art, for road transport.

The implement frame 11 has a center section 12, a right wing section 13 and a left wing section 14. A right side hinge assembly 15 connects the right wing section 13 with the center section 12; and a similar left side hinge assembly 16, connects the left wing section 14 with the center section 12. The hinge assemblies 15, 16 are similar in structure and function although they have mirror images. Therefore, only one of the hinge assemblies need be described in further detail.

Before describing the hinge assembly, however, as has been mentioned, the illustrated embodiment takes the form of a planter. Thus, the center frame section 12 includes a mounting bar 18 on which planter row units are mounted. Two such units are shown in FIG. 1 and generally designated 20. Other units are normally mounted to the center mounting bar 18 but they are not shown for clarity. Similarly, a row unit 20 is mounted on a right side mounting bar 21 of the right frame section 13; and another row unit 20 is mounted on a left mounting bar 22 of the left frame section 14. Again, additional row units, not shown for brevity, may be mounted on the right mounting bar 21 as well as the left mounting bar 22. As illustrated in FIG. 1, the right frame section 13 and left frame section 14 are in the raised position for road transport.

Turning now to FIG. 2, there is shown from the rear, the right hinge assembly 15. The principal components of the hinge assembly are a hydraulic cylinder generally designated 25, a main hinge pin 26, an idler or locator link 27 and a push link generally designated 28.

Turning first to the hydraulic cylinder 25, it has a butt end 29 which is provided with a clevis 30 which is mounted to a vertical bar 31 by means of a pin 32. The bar 31 is welded to the top and bottom walls 18A, 18B of the center mounting bar 18 which, as seen, is in the form of a tube having a generally rectangular cross-section. The bar 31, as seen in FIG. 6, is located in the middle of the tube 18 in the fore-to-aft direction.

The cylinder 25 includes a rod 34, the distal end of which is also provided with a clevis 35 having a pair of laterally aligned apertures 36, 37 (see FIG. 2).

The outboard or distal end of the center mounting bar 18 is provided with a pair of vertical end plates 40, 41 which are welded to the front and rear surfaces of the mounting bar 18 respectively and spaced from one another to receive similar end plates 42, 43 which are welded to the inboard or proximal end of the right mounting bar 21. A sleeve 44 is welded to the front surface of mounting plate 40 with its aperture aligned with an aperture 45 on end plate 40. A similar sleeve 46 is welded to the rear surface of end plate 41 in register with a corresponding aperture of the end plate; and the axes of the bearing sleeves 44, 46 are aligned to receive the main hinge pin 26. The end plates 42, 43 of the right mounting bar 21 are provided with a pair of corresponding aligned apertures, one of which is seen at 49 in FIG. 2; and a fixed sleeve or bearing tube 50 is then welded to the end plates 42, 43 and also receives the main hinge pin 26, as seen in FIG. 3, for example. The main hinge pin 26 may be secured to the sleeves 44, 46 by cotter pins so that it will not become dislodged. An inner end cap 47 is welded to the top and bottom walls of the right tubular frame member 21 and to the inner, opposing surfaces of the end plates 42, 43, as seen in FIGS. 3-5, for strengthening the inboard or proximal end of the right frame section 13.

Referring now to the locator link 27, it is seen to have a crescent shape in order to assume the various positions of use that are required, as will become apparent, particularly with reference to FIG. 4. A slot 33 is formed in the lower wall of the tubular center mounting bar 18 to permit the rotating motion of the idler link 27 to the positions shown in FIGS. 3 and 4. The upper portion of the locator link 27 as seen in FIG. 2 is provided with an aperture 52 which is aligned with the apertures 36, 37 in the clevis 35 of the hydraulic cylinder 25. The other end of the idler link 27 has a sleeve 53 welded to it. At the outer (i.e., forward and rear) ends of the sleeve 53 there are welded first and second stop members 54, 55 respectively. The sleeve 53 and the idler link 27 are received between the end plates 40, 41, and are pivotally mounted to those end plates, and thus to the center mounting bar 18 by a pin 56 which is received through an aperture 57 in end plate 41, and a corresponding, aligned aperture in end plate 40.

Turning now to the push link 28, it is a weldment comprised of elongated first and second side members 59, 60 which may be formed from bar stock, an upper tubular member 61 forming a sleeve and welded to the tops respectively of the side members 59, 60, and a spacer or brace 62, shown in phantom in FIG. 4, which is welded to the lower portion of the sleeve 61 and to the facing surfaces of side members 59, 60 to add rigidity. As best seen in FIG. 6, the longitudinal dimension of the tube 61 is slightly greater than the spacing of the side members 59, 60, thereby giving the push link 28 the appearance of the Greek letter pi. The lower ends of the side members 59, 60 are provided with aligned apertures, one of which is seen in FIG. 2 and designated 63 for receiving a pin 64. The sleeve 61 may be provided with a grease zerk 65. The pin 64 is also received in the apertures 36, 37 of the hydraulic cylinder clevis 35 and the aperture 52 of the idler link 27, thereby forming what is referred to herein as a "pivot juncture", as will be further explained below. The tube 61 of the push link 28 receives a pin 68 which mounts the push link to the end plates 42, 43 of the right mounting bar 21 via apertures 69, 70.

Referring now to FIGS. 3 and 4, an angle member 72 is welded to the inner surfaces of the end plates 40, 41, and the cross member 73 of the angle member 72 engages and limits the motion of the end plates 42, 43 of the wing frame, as best seen in FIG. 5. A first pair of aligned apertures 75 are formed in the upper portion of the end plates 40, 41 respectively as seen in FIG. 2 and a second pair of aligned apertures 76 are similarly formed in the end plates 40, 41. A lock pin generally designated 78 having a handle 79 and an insertion pin 80 may be received in the apertures 75 or 76 for locking the right frame bar in a vertical position. If the pin 78 is desired to be inserted in the apertures 75, then it is also received in a pair of aligned apertures 82 formed in the end plates 42, 43 respectively of the right frame section 13, as best seen in FIG. 2. The locking function of the pin 78 when received in apertures 76 will be described below.

A collar 84 is received in an aperture of the upper wall of the tubular center frame member 18 and welded in place for providing a passage for hydraulic hoses (not shown) connecting hydraulic cylinder 25, which is a double-acting cylinder with the hydraulic outlets of the tractor. The hydraulic system is operated as is well-known, by a lever or handle at the operator's station on the tractor.

OPERATION

Referring now to FIG. 3, when the hydraulic cylinder 25 is retracted, as shown in FIG. 3, by the operation of the control handle located near the operator's station on the tractor, piston rod 34 urges the locator link 27 in counterclockwise rotation about pivot 56. At the same time, the inner end of push link 28 (which is connected to the pivot juncture) is drawn toward the left, permitting the push link to rotate clockwise about the pivot juncture and assume the downwardly and outwardly inclined position shown in FIG. 3. This action permits the outer frame section 13 to rotate about the main hinge pivot 26 under its own weight to the generally horizontal position shown in FIG. 3.

After the hydraulic cylinder 25 is retracted under pressure, the operator places the operating handle in the "float" position which permits the piston rod 34 to float freely in and out, thereby permitting the outer frame section 13 to flex and follow the contour of the ground by rotating above and below an extension of the axis of the center bar 18. It is desirable to limit the downward movement of the wing, as illustrated by the angle A in FIG. 4. For example, when a planter is turned around at the end of a row, if there were no limit to the flexing of the wing sections, the wing sections might drag and damage could occur. The downward motion is limited when the hydraulic cylinder bottoms out in the retraction limit of its stroke. If, for example, the soil level is lower on the right side of the implement, the outer frame section 13 will be permitted to flex downwardly as seen in FIG. 4, rotating about the main hinge pivot 26 and defining a downward and outward slope represented by the angle A in FIG. 4. In this case, the cylinder rod 34 and pivot juncture of pin 64 move even further toward the center of the implement.

When it is desired to raise the outer frame section 13 to the vertical position shown in FIG. 5, the hydraulic cylinder 25 is extended by the operator, thereby causing the piston rod 34 to move toward the right and urging the pivot juncture outwardly or to the right as seen in FIG. 5. This causes the locator link 27 to rotate clockwise about its pivot 56. Further, the push link 28 is urged outwardly; and the end plates 42, 43 of the outer frame section rotate counterclockwise about the main hinge pivot 26, causing the push link 28 both to rotate counterclockwise about pin 64 as it moves outwardly to assume the position shown in FIG. 5.

The wing section swings vertically until the wing plate 42 engages stop member 73. At this time, the pivot juncture (axis of pin 64) lies on a straight line designated L in FIG. 5 extending between the axes of pins 56 and 68. Cylinder 25 is selected and arranged such that there is still a small portion of the stroke remaining. For example, the remaining stroke may be one-eighth of an inch, as illustrated in the drawing by the opposing arrows B. As the cylinder expands the remaining portion of its stroke, it forces the pivot junction or axis of pin 64 over-center—that is, beyond the line L formed by the axes of pins 56 and 68. At this time, the stop members 54, 55 of locator link 27 engage the lower surface of the bottom wall 18B of the center tubular frame member 18. The slot 33 in the bottom wall 18B permits the idler link 27 and the push link 28 to enter the tubular frame 18 as seen in FIG. 4 in the limit position, but the width (that is, the fore-to-aft dimension) of the slot 33 is arranged so that the stop members 54, 55 engage the bottom wall 18B and limit the clockwise or "transport" position of the idler link 27.

With the pivot juncture in the over-center position seen in FIG. 5, the torque created by the weight of the row units (or tools in the case of a cultivator or chisel plow) creates a clockwise moment about the main hinge pin 26. Because the push link 28 is connected to the outer frame section by means of a pin connection—namely, pin 68, the resultant force transmitted along push link 28 tends to cause the pivot juncture to move even further away from the line L which extends through the axes of pivots 56, 58, thereby maintaining the wing in a vertical, locked position, even if hydraulic pressure on the cylinder 25 is lost. The hinge assembly cannot be unlocked until hydraulic pressure returns and is exerted to retract the cylinder rod 34 and move the pivot juncture inwardly or toward the center of the line L.

When it is desired to mechanically lock the wing section 13 in the transport position, the pin 78, as mentioned, may be placed in the aligned pairs of apertures 75, 82 or it may be placed in the aligned apertures 76 in the end plates 40, 41 respectively. As best seen in FIG. 5, if the lock pin 78 is placed in the aperture 76, it prevents retraction of the pivot juncture from the over-center or locked position of FIG. 5.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In an implement adapted to be drawn by a tractor and having an inner frame section and an outer frame section, an improved hinge assembly for connecting said outer frame section to said inner frame section and for moving said outer frame section from a generally horizontal use position to a generally vertical transport position comprising: main hinge pivot means for mounting said outer frame section to said inner frame section for pivotal motion about a horizontal axis; a hydraulic cylinder mounted at one end to said inner frame section and having a second end; a push link pivotally mounted at one end to said outer frame section and having a second end; a locator link pivotally mounted at one end to said inner frame section and having a second end; and pivot juncture means for pivotally interconnecting said second end of said hydraulic cylinder, said second end of said push link and said second end of said locator link to form a pivot juncture therewith, whereby when said hydraulic cylinder is retracted, said push link and said locator link are folded and said outer frame section is lowered to a generally horizontal use position, and when said hydraulic cylinder is extended, said push link and said locator link are unfolded, said outer frame section is rotated to a vertical position and said pivot juncture is moved to a position to function as a locking means for locking said outer frame section mechanically in said vertical position such that said outer frame section remains in said vertical position when hydraulic pressure is lost in said hydraulic cylinder until said hydraulic cylinder is retracted.

2. The apparatus of claim 1 further comprising stop means mounted on the outboard end of said inner frame section for engaging the inboard end of said outer frame section when said outer frame section is raised to the vertical position and for limiting the vertical rotary movement of said outer frame section about said main hinge pivot means and characterized in that when said outer frame section engages said stop means, the axis of said pivot juncture lies on a line extending between the pivot axis of said push link and said outer frame section and the pivot axis of said locator link and said inner frame section; said hydraulic cylinder having additional stroke to move said pivot juncture beyond said line to an over-center position and thereby lock said wing in the raised position.

3. The apparatus of claim 2 wherein said locator link further includes stop means rotating therewith for engaging said center section when said locator is rotated to the transport position to limit the rotation of said locator link.

4. The apparatus of claim 3 further characterized in that the weight of tools or units carried by said outer frame section in the raised position urges said pivot junctured further from said line and the movement of said pivot juncture beyond said line is limited by the stroke of said hydraulic cylinder.

5. The apparatus of claim 1 wherein said inner frame section is the center section of a winged agricultural implement and said outer frame section is the wing section of said implement, said implement including left and right side wing sections, said improved hinge assembly being incorporated in said implement to connect each of said wing sections to the outboard ends respectively of said center frame section.

6. The apparatus of claim 1 wherein said inner frame section comprises a center frame section of a winged agricultural implement and wherein said center frame section includes a tubular mounting bar, and characterized in that said hydraulic cylinder means is located entirely within said tubular mounting bar of said center section in the use position.

7. The apparatus of claim 6 wherein said outer frame section includes a tubular mounting bar and the tubular mounting bar of said inner frame section is adapted to receive ground working tools or row units and wherein the longitudinal axes of said outer frame section mounting bar and said inner frame section mounting bar define a generally horizontal line when said wing section is in the use position, and wherein the axis of said main hinge pivot is located above the longitudinal axes of said mounting bars in the use position, and wherein the pivot axis of said locator link and said inner frame section and the pivot axis of said push link and said outer frame section are located beneath said longitudinal axes of said mounting bars in the use position.

* * * * *

UNITED STATES PATENT AND TRADEMARK OFFICE
CERTIFICATE OF CORRECTION

PATENT NO. : 4,923,017
DATED : May 8, 1990
INVENTOR(S) : Roger L. Meek and Alan F. Barry It is certified that error appears in the above-identified patent and that said Letters Patent is hereby corrected as shown below:

In the claims:

Col. 8, line 5, after "locator", insert --link-- ;

and line 11, "junctured" should be --juncture-- .

Signed and Sealed this

Thirteenth Day of August, 1991

Attest:

HARRY F. MANBECK, JR.

*Attesting Officer*   *Commissioner of Patents and Trademarks*